UNITED STATES PATENT OFFICE.

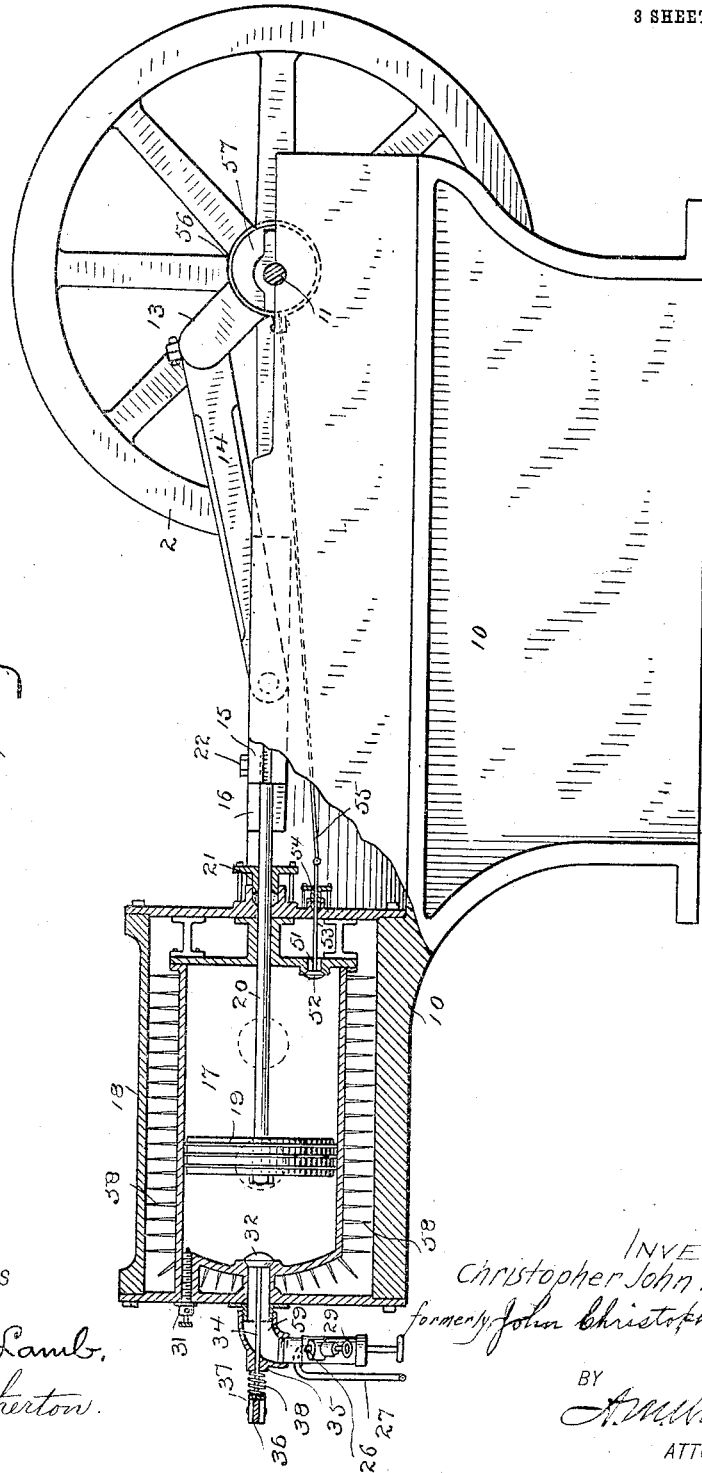

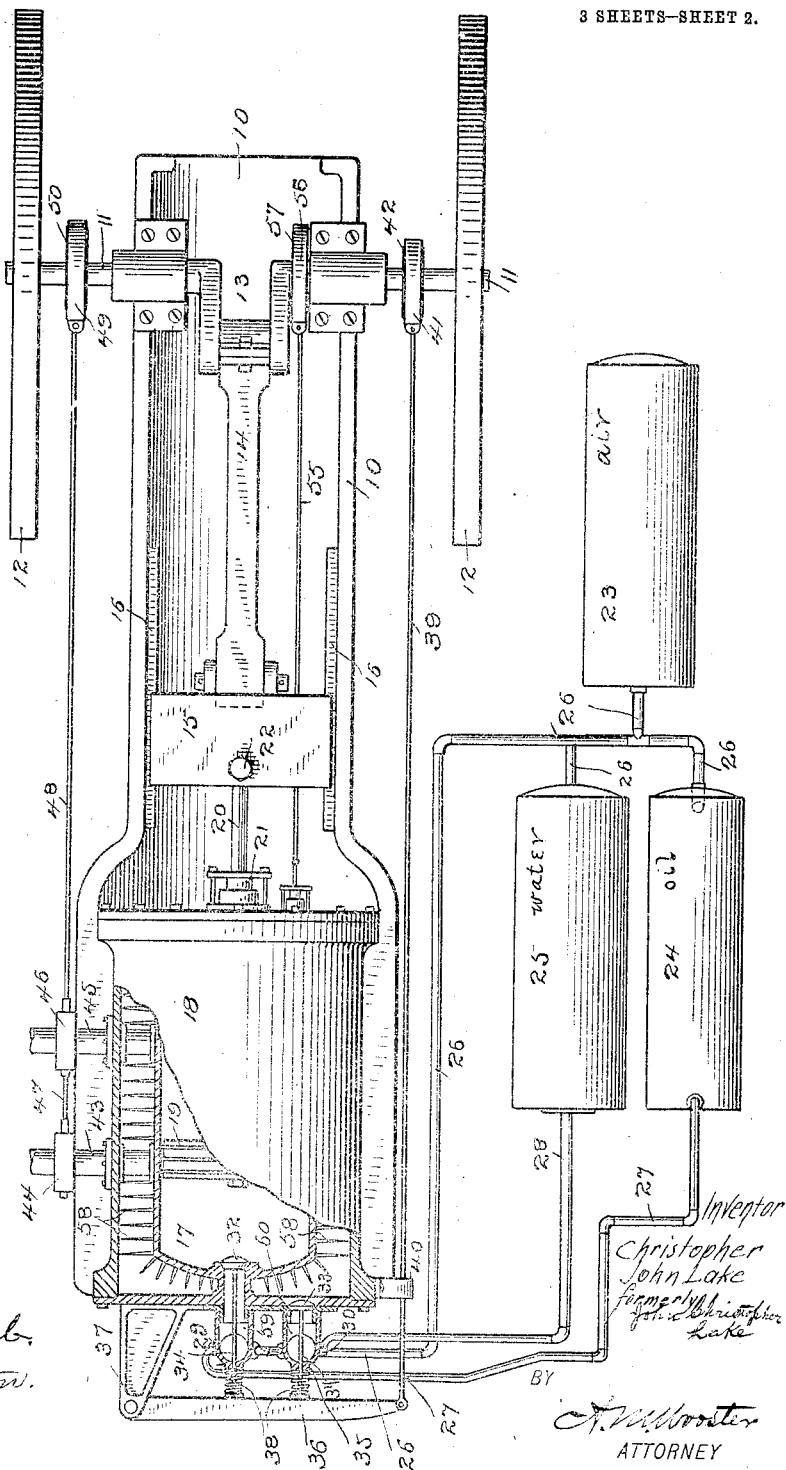

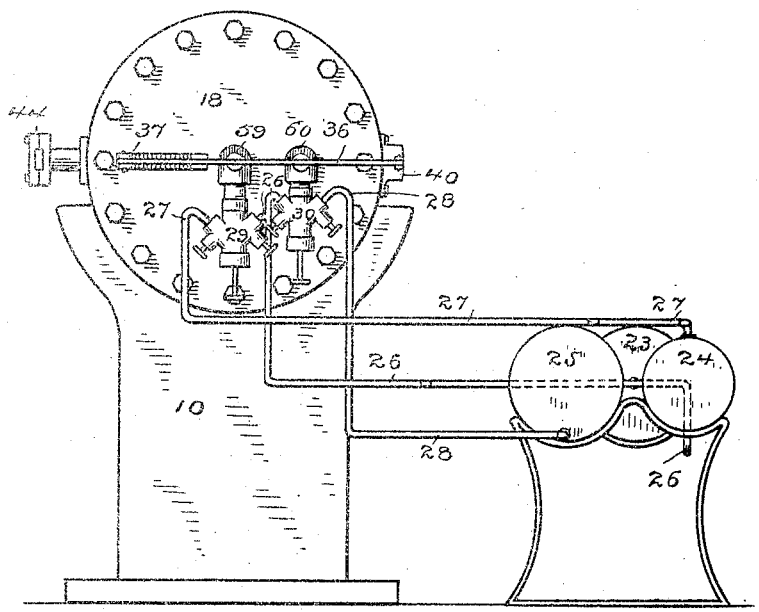

CHRISTOPHER JOHN LAKE, (NAME CHANGED FROM JOHN CHRISTOPHER LAKE BY JUDICIAL ORDER,) OF BRIDGEPORT, CONNECTICUT.

ENGINE.

971,760. Specification of Letters Patent. Patented Oct. 4, 1910.

Application filed February 2, 1906. Serial No. 299,178.

*To all whom it may concern:*

Be it known that I, CHRISTOPHER JOHN LAKE, (formerly JOHN CHRISTOPHER LAKE,) a citizen of the United States, and resident of Bridgeport, in the county of Fairfield and State of Connecticut, have invented certain new and useful Improvements in Engines, of which the following is a specification.

This invention relates to explosion engines and has particular reference to that class of explosion engines in which the heat of the explosions is used for the production of a secondary power fluid which may be used to assist in driving the engine or for any other convenient purpose.

The invention has for its general object the convenient, economical and otherwise advantageous production of power, a more particular object being the efficient utilization of the energy of exploded hydrocarbons and air or of other explosive mixtures.

A further object is to produce an engine which shall have the tractability and reliability of the steam engine and the convenient fuel form of the oil or gas engine.

A further object is to produce an engine in which the heat of the exhaust may be varied from a very low temperature, where the highest efficiency is desired, to a comparatively high temperature where it is desired to use the exhaust gases and vapors for heating or other similar purposes.

A further object of the invention is to produce an engine in which the heat of the explosions can be so readily imparted to a suitable heat-absorbing agent as to convert it at once into an abundant pressure fluid capable of being used in alternation with the explosions to drive the engine or for heating or other purposes, either immediately or after having aided in the driving of the engine.

A further specific object is to provide for the employment of air with finely-divided water in suspension as a heat-absorbing agent together with means for the most rapid communication of heat to the particles of water and to the resulting mixture of steam and heated air.

The invention further consists in certain parts, improvements and combinations hereinafter described and specifically claimed.

In the accompanying drawings forming a part of this specification, Figure 1 is a view partly in side elevation and partly in vertical section, illustrating the construction and mode of operation of my novel engine; Fig. 2 a plan view partly in horizontal section; and Fig. 3 is an end elevation as seen from the left in Figs. 1 and 2.

So far as the principle of the invention is concerned any combustible gas or vapor may be exploded or ignited to drive the piston in one direction, and I wish it distinctly understood that the invention is not limited to any special method of generating or producing the gas or vapor. For the purposes of this specification I have illustrated a form of the invention in which the piston is driven in one direction by the ignition of a combustible vapor of mixed oil and air.

10 denotes the bed of the engine, 11 the shaft, 12 balance wheels, 13 the crank, 14 the connecting rod and 15 a cross head to which the connecting rod is pivoted and which reciprocates in ways 16 on the bed, all of which parts may be of any ordinary or preferred construction.

17 denotes the cylinder, 18 a casing in which it is inclosed, 19 the piston and 20 the piston rod which passes through a stuffing box 21 at the rear end of the casing and is connected to the cross head as by a pin 22.

23 denotes a tank for compressed air which is kept supplied with air under uniform pressure by any suitable means, which forms no portion of the present invention.

24 denotes an oil tank, 25 a water tank and 26 a pipe leading from the air tank branches of which connect with the oil and water tanks and with oil and air and water and air valves denoted respectively by 29 and 30.

27 denotes a pipe leading from the oil tank to valve 29, and 28 a pipe leading from the water tank to valve 30.

Air from tank 23 entering oil tank 24 through a branch of pipe 26 forces oil through pipe 27 to oil and air valve 29. Another branch of pipe 26 supplies air also to this valve. The oil and air become thoroughly commingled in the valve and form an explosive vapor of mixed oil and air which passes to the cylinder through pipe 59. Valve 29 is so constructed that both the oil supply and the air supply can be regulated at will and if required the supply of both oil and air can be shut off and opened simultaneously. The entrance of oil and air vapor to the cylinder is controlled by means of a valve 32 in pipe 59. At predetermined times the oil and air vapor in the cylinder is ignited by means of a spark plug 31 connected with a battery, not shown in the drawings, and operated by suitable connections which are likewise not shown in the drawings as the special connections and mode of operation of the spark plug are wholly unimportant so far as the present invention is concerned. Air from tank 23 entering water tank 25 through another branch of pipe 26 forces water through pipe 28 to water and air valve 30. Still another branch of pipe 26 supplies air also to this valve. The water and air become thoroughly commingled in the valve and pass to the casing in the form of aerated spray through pipe 60. Valve 30 is similar in construction to valve 29. Both the water supply and the air supply can be regulated at will and if required the supply of both water and air can be shut off and opened simultaneously. The entrance of spray of water and air to the casing is controlled by means of a valve 33 in pipe 60. The stems of valves 32 and 33, both indicated by 34, extend through guides 35 and engage a lever 36 pivoted to a bracket 37 shown as secured to the casing. Springs 38 bearing against heads upon the valve stems and the guides act to retain these valves in engagement with their seats. Lever 36 is operated to open these valves in unison by means of a rod 39 which passes through a guide 40 secured to the cylinder and is connected to an eccentric strap 41 inclosing an eccentric 42 on the shaft.

43 denotes an exhaust pipe for exploded vapor leading from the cylinder and 44 a valve in said pipe.

45 denotes an exhaust pipe for heated air and steam leading from the cylinder and 46 a valve in said pipe. These valves, which are timed to operate as I shall presently describe, are connected by means of a rod 47 and are both operated by means of a rod 48 which is connected to an eccentric strap 49 which incloses an eccentric 50 on the shaft.

51 denotes a heated air and steam port leading from the casing to the cylinder and 52 a valve in said port which controls the passage of heated air and steam. The stem 53 of this valve passes through a stuffing box 54 and is pivoted to a rod 55 which in turn is connected to an eccentric strap 56 which incloses an eccentric 57 on the shaft.

58 denotes radiating projections extending from the cylinder into the casing which radiate the heat generated in the cylinder by the explosion of oil and air vapor therein and convert the aerated spray which enters the casing through pipe 60 into heated air and steam, thus utilizing the heat of the cylinder in the production of heated air and steam in the casing and at the same time preventing the cylinder from becoming unduly heated.

The operation is as follows: In the drawings the piston is represented as being driven toward the left by heated air and steam, and the spent gases of an explosion of oil and air vapor on the left side of the piston have been exhausting through pipe 43, the valve 44 in which was of course open. Valve 44 is timed to close when the forward side of the piston passes exhaust pipe 43. At the same time valve 32 in pipe 59 opens and a charge of oil and air vapor is forced into the cylinder from oil and air valve 29, after which valve 32 closes. Valve 33 in pipe 60 which admits water and air from valve 30 in the form of aerated spray into the casing operates in unison with valve 32. At the instant the piston reaches the limit of its movement toward the left the charge of oil and air vapor in the cylinder is ignited by means of the spark plug, and the expansion of the burning vapor drives the piston toward the right. Valve 46 in exhaust pipe 45 leading from the cylinder is timed to open at the instant the vapor is ignited in the left end of the cylinder, so that the heated air and steam on the right side of the piston will exhaust as the piston moves toward the right. At the instant the piston reaches the extreme of its movement toward the right, valve 52 in heated air and steam port 51 at the right end of the cylinder opens to admit the heated air and steam from the casing into the cylinder on the right side of the piston, and valve 44 in exhaust pipe 43 opens and permits the spent gas on the left side of the piston to exhaust through said pipe as the piston moves toward the left. Valve 52 in heated air and steam port 51 is ordinarily timed to close at the instant the piston covers exhaust pipe 43. It is obvious however that by shifting eccentric 57 on the shaft, this valve may be adjusted to cut off, sooner or later, as may be desired.

I am aware that others have proposed the employment of steam or of steam and air in alternation with explosions against a piston. In all the earlier devices, however, there has been no adequate means for readily transferring any great portion of the heat of the explosions to the steam and air. In the present invention special provision is made for this by the projections 58 upon the exterior of the cylinder 17. These projections, while they aid in keeping the cylinder suitably cool, are not necessary for that purpose and aid in it only incidentally, since sufficient cooling can be effected with plain cylinder walls, especially when water is used. The important function of these projections is to distribute the heat-communicating surfaces throughout the entire body of the aerated spray in order that all parts of it may receive heat and become instantly flashed into a mixture of steam and highly-heated air. This gives an ample supply of pressure fluid at each stroke and produces a fair balance or correspondence between the amount of power exerted on opposite sides of the piston. A peculiar advantage arising from the employment of the projections 58 in connection with a fluid composed of air containing finely-divided water in suspension is that these projections transmit an abundance of heat to the remotest particle of water which would otherwise be insulated by the intervening air.

An engine of the character described possesses greater efficiency than either steam or explosive engines heretofore used. By using the water suspended in air and in small quantity only a small amount of the heat is required for its evaporation, leaving the greater part of the heat conducted from the explosions to raise the temperature and pressure of the evaporated water and air instead of being wasted in the latent heat of evaporation of the water, and the heat-conducting surfaces are so arranged that this can take place with the greatest rapidity. The water in the air also serves to prevent overheating of the cylinder at the same time that it conserves the surplus heat of the explosions. The water and air and also the fuel charge being under perfect control the engine may be regulated for varying loads and it is possible to so adjust the engine that it will convert the highest percentage of the fuel energy into work, or heavier charges may be supplied and the surplus energy may be passed off in the exhaust steam and air or the exhaust waste gases or both and utilized for heating or other purposes.

Having thus described my invention I claim:

1. In an engine, the combination with a generating chamber and means for producing explosions therein, of heat-distributing projections on the exterior walls of the generating chamber, a heat-absorbing chamber contiguous to the generating chamber and inclosing said projections, means for producing a mixture of air and finely divided water in suspension as a heat-absorbing agent, a port in said heat-absorbing chamber for admitting said mixture of air and water thereto to be converted into pressure fluid by heat from the explosions and means for employing said pressure fluid in alternation with the explosions to drive the engine.

2. In an engine the combination with a generating chamber, a piston therein and means for producing explosions in one end of the chamber to drive the piston in one direction, of heat-distributing projections on the exterior walls of the generating chamber, a heat-absorbing chamber contiguous to the generating chamber and inclosing said projections, means for producing a mixture of air and finely-divided water in suspension as a heat-absorbing agent, a port in said heat-absorbing chamber for admitting said mixture of air and water thereto to be converted into pressure fluid by the heat of the explosions and means for applying said pressure fluid to the piston in the generating chamber to drive it in the opposite direction.

3. In an engine, the combination with a cylinder, a piston therein, and a casing inclosing the cylinder, of oil, water and compressed air tanks, oil and air and water and air valves, pipes leading from the compressed air tank to the oil and water tanks and to said valves, pipes leading from the water and oil tanks to said valves, a pipe leading from the oil and air valve to the cylinder and a pipe leading from the water and air valve to the casing.

4. In an engine, the combination with a cylinder, a piston therein, and a casing inclosing the cylinder, of oil, water and compressed air tanks, oil and air and water and air valves, pipes leading from the compressed air tank to the oil and water tanks and to said valves, pipes leading from the water and oil tanks to said valves, a pipe leading from the oil and air valve to the cylinder, a pipe leading from the water and air valve to the casing, valves in the pipes leading into the cylinder and casing and means for operating said last named valves, substantially as described, for the purpose specified.

5. In an engine, the combination with a cylinder, a piston therein, a casing inclosing the cylinder and radiating projections extending from the cylinder, of oil, water and compressed air tanks, oil and air and water and air valves, pipes leading from the compressed air tank to the oil and water tanks and to said valves, and pipes leading from the water and oil tanks to said valves, whereby an explosive mixture is conducted to the cylinder and a mixture of water and air is conducted to the casing in the form of spray where the air is heated and the water converted into steam by the heat of the cylinder, a port for admitting the heated air and steam to the cylinder and a spark plug for igniting the explosive mixture.

6. In an engine, the combination with a cylinder, a piston therein, a casing inclosing the cylinder, oil, water and compressed air tanks and oil and air and water and air valves, of pipes leading from the compressed air tank to the oil and water tanks and to the oil and air and water and air valves, pipes leading from the water and oil tanks to said valves, a pipe leading from the oil and air valve to one end of the cylinder, a spark plug in the cylinder, a pipe leading from the water and air valve to the casing, a port leading from the casing to the other end of the cylinder, exhaust pipes leading from the cylinder, valves in the pipes leading into the cylinder and the casing and in the port and in the exhaust pipes, and means for operating said last named valves, substantially as described, and for the purpose specified.

In testimony whereof I affix my signature, in presence of two witnesses.

CHRISTOPHER JOHN LAKE
(FORMERLY JOHN CHRISTOPHER LAKE

Witnesses:
N. P. McKNEW,
V. T. KIDWELL.